(No Model.)

J. RADDIN.
SAFETY ATTACHMENT FOR CAR TRUCKS.

No. 273,308. Patented Mar. 6, 1883.

WITNESSES
N. C. Fogg.
Fred Harris

INVENTOR
John Raddin
by his attys
Chisholm & Raymond

UNITED STATES PATENT OFFICE.

JOHN RADDIN, OF LYNN, MASSACHUSETTS.

SAFETY ATTACHMENT FOR CAR-TRUCKS.

SPECIFICATION forming part of Letters Patent No. 273,308, dated March 6, 1883.

Application filed April 17, 1882. (No model.)

*To all whom it may concern:*

Be it known that I, JOHN RADDIN, of Lynn, in the county of Essex and State of Massachusetts, a citizen of the United States, have invented a new and useful Improvement in Safety Attachments for Wheels in the Running-Gear of Cars, of which the following is a full, clear, and exact description, reference being had to the accompanying drawings, in which like letters denote corresponding parts.

My present invention relates to a device for supporting a car-wheel when, by reason of the breaking of the car-axle, said wheel has lost its usual support.

This invention is an improvement upon my former invention, for which application for a patent was filed January 25, 1882. The particular device for supporting the wheel is by a plate attached to the car-frame, having an overlapping edge which projects over the face of the wheel.

Figure 1:
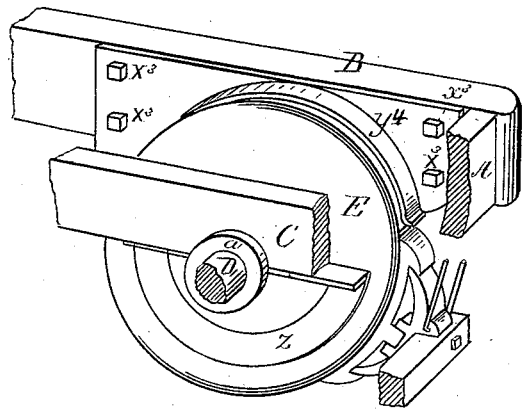
Figure 3:
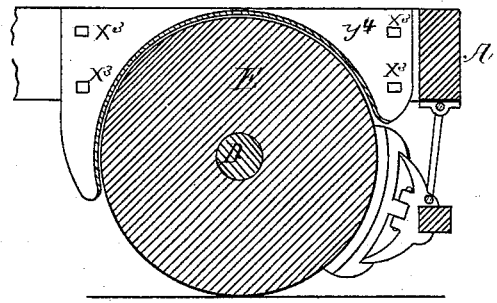
Figure 2:
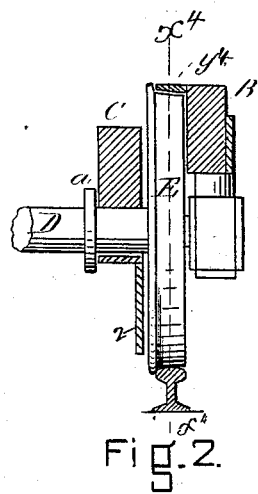

Figure 1 is a general view of this wheel-supporting device. Fig. 2 is a view in cross-section. Fig. 3 is a sectional view at the point $x^4$ of Fig. 2.

It is obvious that when a car-axle has become fractured the wheel or wheels to which it was attached thereby lose their vertical support, and if unsupported by supplemental devices will twist or cripple and be thrown from the track. As I have already explained in my former application upon this subject, it is necessary to not only support the axle when fractured and prevent its transverse shifting, but the wheels must also be supported by efficient devices strongly secured to the frame-work of the truck. In my former application upon this subject I represented several devices for wheel-supports, and my present invention is for the same purpose, but from its peculiar form and position performs the object more perfectly and efficiently.

In Fig. 1, D is the axle; A B, the framework of the truck; C, a supplemental framework, to which is attached a collar, $a$, to prevent the transverse shifting of the axle D. E is the wheel. The plate $y^4$ is secured, by bolts $x^3$ $x^3$ or other suitable devices, to the frame B, the plate $y^4$ being of metal of considerable thickness, so that it may be able to withstand the strain and pressure from the wheels. It is not intended that this plate shall attach to the wheel unless the axle D is fractured, and the wheel E has thus lost its support.

In Fig. 2 is shown the overlapping part of the plate $y^4$. This overlapping plate extends nearly across the face of the wheel E, so that in case of injury to the axle the flange of the wheel E will press upon the edge of the overlapping part of the plate $y^4$. In case of any depression or dropping of the track this plate will also serve as a brake upon the wheel and assist in stopping the train. It will be observed that the ends of this plate $y^4$ are made to extend downward upon each side of the face of the wheel, which is shown clearly in Fig. 3. With this support it is impossible for the wheel to cripple or be twisted from the track, more especially when used in connection with a lower plate, (represented by $z$,) and which is a part of my former invention upon this subject, as already explained.

Having thus fully described my invention, I claim and desire to secure by Letters Patent of the United States—

1. The combination of the car-axle D, the collar $a$, the wheel E, wheel-supports $y^4$ and $z$, and the truck-frame B and C, all arranged, combined, and adapted to operate substantially as and for the purposes set forth.

2. In combination with the frame of a car-truck, the metal plate $y^4$, bolted or secured to the frame by bolts $x^3$ $x^3$, and having a narrow circular projecting ledge or rim adapted to fit closely the face of the car-wheel, and extending nearly to, but not wholly outside of, the flange of the wheel, and without covering either side of the body of the wheel, substantially as and for the purposes set forth.

3. In a car-truck, the supporting-plate $y^4$ and a suitable supporting-plate placed upon the inner side of the wheel, near the bottom, in combination with a car-wheel, substantially as specified.

4. A plate with a rim adapted to cover the upper half of the periphery of the face of a car-wheel outside the flange, the said rim being formed to the periphery of the face, and with its edge lower than the top edge of the flange of the wheel, and attached to a truck-frame of a car, in combination with a car-wheel, and a supplemental truck-frame having a narrow plate secured or affixed to the same and extending downward inside and near the bottom of the side of the wheel, as and for the purposes specified.

JOHN RADDIN.

Witnesses:
BOWDOIN S. PARKER,
FRED. HARRIS.